(12) United States Patent
Takeda

(10) Patent No.: US 9,902,431 B2
(45) Date of Patent: Feb. 27, 2018

(54) VEHICLE BODY STRUCTURE

(71) Applicant: HONDA MOTOR CO., LTD., Tokyo (JP)

(72) Inventor: Tomoya Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/418,955

(22) Filed: Jan. 30, 2017

(65) Prior Publication Data

US 2017/0217501 A1 Aug. 3, 2017

(30) Foreign Application Priority Data

Feb. 3, 2016 (JP) .................................. 2016-018913

(51) Int. Cl.
*B62D 7/22* (2006.01)
*B62D 25/08* (2006.01)
*B60R 19/24* (2006.01)
*B62D 21/02* (2006.01)
*B62D 21/15* (2006.01)

(52) U.S. Cl.
CPC .............. *B62D 25/08* (2013.01); *B60R 19/24* (2013.01); *B62D 21/02* (2013.01); *B62D 21/152* (2013.01); *B60R 2019/247* (2013.01)

(58) Field of Classification Search
CPC ... B60R 19/24; B60R 2019/247; B62D 25/08; B62D 21/152
USPC ............. 280/784; 296/187.03, 187.09, 187.1
See application file for complete search history.

(56) References Cited

U.S. PATENT DOCUMENTS 8,702,158 B2 * 4/2014 Kihara ................. B62D 25/082
296/203.02
9,248,865 B2 * 2/2016 Hisazumi ............. B62D 25/082
9,539,968 B2 * 1/2017 Nishida ................ B62D 21/152
(Continued)

FOREIGN PATENT DOCUMENTS

JP 7-47977 A 2/1995
JP 2008-080818 A 4/2008
(Continued)

OTHER PUBLICATIONS

Office Action dated Aug. 23, 2017, issued in counterpart Japanese application No. 2016-018913, with English translation. (8 pages).

*Primary Examiner* — Toan To
(74) *Attorney, Agent, or Firm* — Westerman, Hattori, Daniels & Adrian, LLP

(57) ABSTRACT

A front side frame has a closed section through coupling between a frame main body having a U-shaped section that opens to the outboard side and a back plate that closes the opening of the frame main body. A reinforcing frame having a U-shaped section that opens to the outboard side in a frame widened section of the front side frame is fitted to the inside of the frame main body. A vehicle-width-direction inboard wall of the reinforcing frame is coupled to a vehicle-width-direction inboard wall of the frame main body at a branch point. A portion of the vehicle-width-direction inboard wall in front of the branch point separates from the vehicle-width-direction inboard wall of the frame main body to the outboard side. The opening of the reinforcing frame is closed by the back plate in the front section of the frame widened section.

11 Claims, 7 Drawing Sheets

(56) References Cited

U.S. PATENT DOCUMENTS

| | | | | |
|---|---|---|---|---|
| 9,676,353 B2* | 6/2017 | Sotoyama | ............ | B62D 21/152 |
| 9,688,311 B2* | 6/2017 | Yamamoto | ............ | B62D 25/025 |
| 9,714,052 B2* | 7/2017 | Matsuoka | ............. | B62D 21/152 |
| 9,821,741 B2* | 11/2017 | Kashiwagi | .............. | B60R 19/34 |
| 9,821,850 B2* | 11/2017 | Tsukada | ................... | B60K 1/04 |
| 2009/0079210 A1* | 3/2009 | Matsumura | ............. | B60R 19/24 |
| | | | | 293/155 |
| 2011/0083923 A1* | 4/2011 | Ajisaka | ................. | B62D 21/06 |
| | | | | 180/291 |
| 2016/0059810 A1* | 3/2016 | Watanabe | ........... | B62D 21/152 |
| | | | | 293/133 |
| 2016/0244098 A1* | 8/2016 | Kanemori | ........... | B62D 21/152 |
| 2017/0183038 A1* | 6/2017 | Dressel | ............... | B62D 21/152 |

FOREIGN PATENT DOCUMENTS

| | | |
|---|---|---|
| JP | 2009-154859 A | 7/2009 |
| JP | 2013-119359 A | 6/2013 |
| JP | 2013-169806 A | 9/2013 |
| JP | 5357953 B2 | 12/2013 |
| JP | 5469697 B2 | 4/2014 |
| WO | WO2015/156052 A1 | 4/2017 |

* cited by examiner

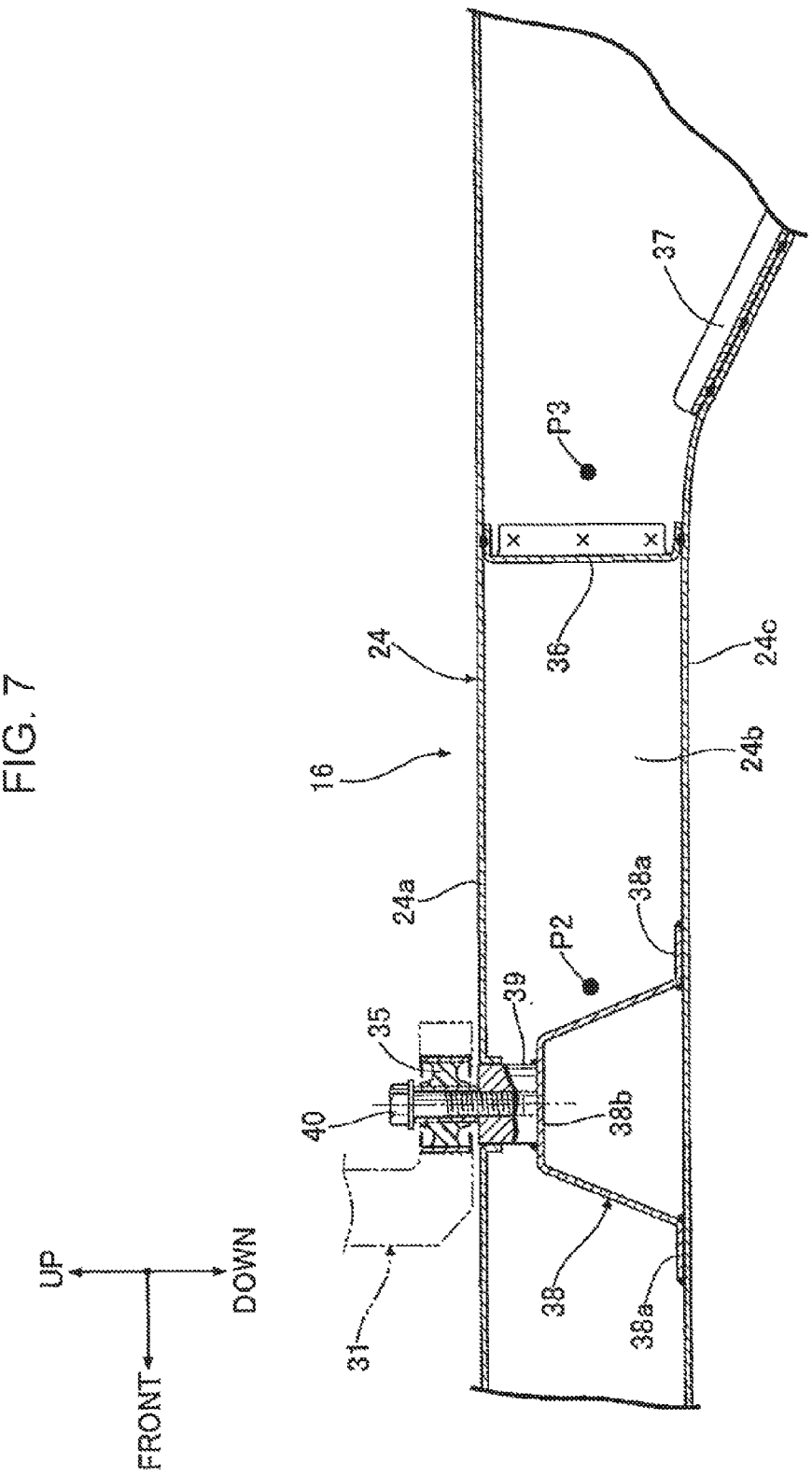

__

VEHICLE BODY STRUCTURE

CROSS REFERENCES TO RELATED APPLICATIONS

The present application claims priority under 35 U.S.C. § 119 to Japanese Patent Application No. 2016-018913, filed Feb. 3, 2016, entitled "Vehicle Body Structure." The contents of this application are incorporated herein by reference in their entirety.

TECHNICAL FIELD

The present disclosure relates to a vehicle body structure in which each of right and left front side frames longitudinally disposed in a front section of a vehicle includes a frame floor section that longitudinally extends along an underside of a floor, a frame slanted section that extends obliquely forward from a third break point located at a front end of the frame floor section so as to be curved toward the outboard side of the vehicle in the vehicle-width direction, a frame linear section that extends forward from a second break point located at a front end of the frame slanted section and that has an outboard end in the vehicle-width direction thereof recessed toward the inboard side in the vehicle-width direction at a first break point located midway in the longitudinal direction, and a frame widened section that extends forward from a branch point located at a front end of the frame linear section so as to have an outboard end in the vehicle-width direction thereof bulging more toward the outboard side in the vehicle-width direction at a portion thereof closer to the front of the vehicle.

BACKGROUND

From Japanese Patent No. 5357953, there is publicly known a vehicle body structure in which a front side frame has a branch frame that extends forward so as to run diagonally toward the outboard side in the vehicle-width direction from a fragile section provided on an outboard surface in the vehicle-width direction thereof and in which front ends of the front side frame and the branch frame are coupled to each other with a coupling member therebetween and, in the event of a narrow offset collision, the front side frame is bent at the fragile section, which causes a power unit to be pressed rearward, thereby absorbing impact energy.

In addition, from Japanese Patent No. 5469697, there is publicly known a vehicle body structure in which a front side frame has a first break point, a second break point, and a third break point provided in this order from front to rear and in which an outboard surface in the vehicle-width direction of the front side frame in front of the first break point and a front end of a lower member are coupled to each other with a triangle-shaped gusset therebetween and, in the event of a narrow offset collision, the front side frame is bent at the first break point, the second break point, and then the third break point in this order, thereby absorbing impact energy.

The vehicle body structure disclosed in Japanese Patent No. 5357353, however, is likely to have possibility that impact load is concentrated on the fragile section in the event of a narrow offset collision.

In addition, the vehicle body structure disclosed in Japanese Patent No. 5469697 is also likely to have possibility that, when an impact load resulting from an oblique collision is exerted on the gusset, the impact load concentrates on the first break point.

SUMMARY

The present application describes, for example, a vehicle body structure that improves an energy absorbing function by ensuring that a front side frame is bent at first through third break points.

A first aspect of the present application provides a vehicle body structure in which each of right and left side frames longitudinally disposed in a front section of a vehicle includes a frame floor section that longitudinally extends along an underside of a floor, a frame slanted section that extends diagonally forward from a third break point located at a front end of the frame floor section so as to be curved toward the outboard side of the vehicle in the vehicle-width direction, a frame linear section that extends forward from a second break point located at a front end of the frame slanted section and that has an outboard end in the vehicle-width direction thereof recessed toward the inboard side in the vehicle-width direction at a first break point located midway in the longitudinal direction, and a frame widened section that extends forward from a branch point located at a front end of the frame linear section so as to have an outboard end in the vehicle-width direction thereof bulging more toward the outboard side in the vehicle-width direction at a portion thereof closer to the front of the vehicle, in which each of the front side frames has a closed section through coupling of a frame main body having a U-shaped section that opens to the outboard side in the vehicle-width direction and a back plate that closes an opening of the frame main body, in which a reinforcing frame having a U-shaped section that opens to the outboard side in the vehicle-width direction in the frame widened section is fitted to the inside of the frame main body, and in which an inboard wall in the vehicle-width direction of the reinforcing frame is coupled to an inboard wall in the vehicle-width direction of the frame main body at the branch point and a portion of the inboard wall in front of the branch point separates from the inboard wall in the vehicle-width direction of the frame main body to the outboard side in the vehicle-width direction, and the opening of the reinforcing frame is closed by the back plate in the front section of the frame widened section. With this arrangement, an impact load applied to a front end of the reinforcing frame in the event of an oblique collision is transmitted to the inboard wall in the vehicle-width direction of the reinforcing frame and then to the branch point where the transmission of the impact load is switched to the frame linear section, which avoids concentration of the impact load on the first break point having an outboard end in the vehicle-width direction of the frame linear section recessed toward the inboard side in the vicinity thereof, thereby enabling the impact load to be preferentially transmitted to the second break point. This ensures that the second break point provided in the middle of the first and third break points arranged in order from front to rear is first bent and subsequently the first and third break points are bent. Consequently, the bending of the first to third break points improves the absorption of impact energy associated with an oblique collision. In particular, the frame main body having a U-shaped section that opens to the outboard side in the vehicle-width direction and the reinforcing frame having a U-shaped section that opens to the outboard side in the vehicle-width direction are fitted to each other in the frame widened section extending from the branch point to the front end in the front side frame, which strengthens an inboard end in the vehicle-width direction of the front side frame, thereby enabling a smoother load transmission.

A second aspect of the present application provides the vehicle body structure of the first aspect in which a front pillar, an upper member extending forward from the front pillar, and a lower member that extends from a front end of the upper member and that is laid on the outboard side in the vehicle-width direction of the front side frame may be provided and in which a bumper beam extension may be supported on a mounting plate coupled to front ends of the frame main body, the reinforcing frame, and the lower member all of which are aligned in the vehicle-width direction. With this arrangement, when subjected to an impact load in the event of a frontal collision, the frame main body, the reinforcing frame, and the lower member generate a reactive force, which causes the bumper beam extension to be effectively crushed and thereby improves energy absorption effects.

A third aspect of the present application provides the vehicle body structure of the second aspect in which, in the rear section of the reinforcing frame, flanges formed by bending an upper wall of the frame main body upward and a lower wall of the frame main body downward, respectively, may be coupled to flanges formed by extending an upper end of the back plate upward and a lower end of the back plate downward, respectively, and in which, in the front section of the reinforcing frame, flanges formed by bending upper and lower ends of the back plate to the outboard side in the vehicle-width direction, respectively, may be coupled to flanges of the reinforcing frame and upper and lower walls of the lower member, respectively, the flanges being formed by extending upper and lower walls of the reinforcing frame to the outboard side in the vehicle-width direction, respectively. This arrangement ensures that the frame main body and the back plate are tightly integrated with each other in the rear section of the frame widened section and that the reinforcing frame, the back plate, and the lower member are also tightly integrated with one another in the front section of the frame widened section.

A fourth aspect of the present application provides the vehicle body structure of the second or third aspect in which a bumper beam extension may be a cylindrical body having a horizontally long section with a dimension thereof in the vehicle-width direction larger than a dimension thereof in the vertical dimension and may have a longitudinally extending partition wall between an inboard wall in the vehicle-width direction thereof and an outboard wall in the vehicle-width direction thereof, in which the inboard wall in the vehicle-width direction of the bumper beam extension may be aligned with the inboard wall in the vehicle-width direction of the frame main body in this order from front to rear, in which the partition wall of the bumper beam extension may be aligned with the inboard wall in the vehicle-width direction of the reinforcing frame in this order from front to rear, and in which the outboard wall in the vehicle-width direction of the bumper beam extension may be aligned with the outboard wall in the vehicle-width direction of the lower member in this order from front to rear. With this arrangement, an impact load applied to the bumper beam extension is effectively transmitted to the front side frame and the lower member, which encourages the bumper beam extension to be crushed and thereby improves energy absorption effects. Moreover, the bumper beam extension having a cross section with the longer dimension in the vehicle-width direction is resistant to falling when subjected to an impact load, further ensuring the crushing of the bumper beam extension.

A fifth aspect of the present application provides the vehicle body structure of any one of the first to fourth aspects in which, in the front section of the frame widened section D, outboard ends in the vehicle-width direction of the upper wall and the lower wall of the reinforcing frame may project from the frame main body to the outboard side in the vehicle-width direction. This arrangement enables the front section of the front side frame to be widened while an increase in weight is minimized.

A sixth aspect of the present application provides the vehicle body structure of any one of the first to fifth aspects in which, in the front section of the frame widened section, a portion of the inboard wall in the vehicle-width direction of the reinforcing frame may separate farther away from the inboard wall in the vehicle-width direction of the frame main body to the outboard side in the vehicle-width direction as the portion becomes closer to the front end of the reinforcing frame and in which a mount for supporting a power unit may be provided between the inboard wall in the vehicle-width direction of the reinforcing frame and the inboard wall in the vehicle-width direction of the frame main body. This arrangement enables the mount to be provided in an area where a closed section is formed by the frame main body and the reinforcing frame, thereby improving the support rigidity.

A seventh aspect of the present application provides the vehicle body structure of any one of the first to sixth in which a mounting bracket for other mount for supporting the power unit may be coupled to the front side frame with its both ends' two fixing members therebetween and in which the second break point may be provided between the two fixing members. With this arrangement, the second break point can be configured to have relatively lower strength, thereby ensuring that the second break point is bent.

An eighth aspect of the present application provides the vehicle body structure of any one of the first to seventh aspects in which a recess formed on the outboard side in the vehicle-width direction of the first break point may be provided so as to avoid contact with a front end of a steered front wheel and in which a cross-sectional area of the frame linear section at the first break point may be smaller than cross-sectional areas of the frame linear section at portions preceding and succeeding the first break point. With this arrangement, the recess can prevent the steered front wheel from coming into contact with the front side frame even if the front section of the front side frame is widened toward the outboard side in the vehicle-width direction to allow the installation of a transverse-mounted power unit having a larger dimension in the vehicle-width direction. Moreover, the impact load can be transmitted from the first break point to the second break point without any difficulty while the inboard end in the vehicle-width direction of the frame linear section is kept linear.

A ninth aspect of the present application provides the vehicle body structure of any one of the first to eighth aspects in which the front side frame may be provided with reinforcing members at portions preceding and succeeding the third break point. With this arrangement, the third break point can be configured to have lower rigidity than portions of the reinforcing members that precedes and succeeds the third break point, respectively, thereby ensuring that the third break point is bent due to an impact load.

For example, a front pillar 12 according to an embodiment corresponds to a front pillar according to the present application. For example, a back plate 28 according to the embodiment corresponds to an outboard wall in the vehicle-width direction according to the present application. For example, a bulkhead 36 and a stiffener 37 correspond to a reinforcing member according to the present application.

BRIEF DESCRIPTION OF THE DRAWINGS

The advantages of the disclosure will become apparent in the following description taken in conjunction with the following drawings.

FIG. 7 is a cross-sectional view taken along the line VII-VII of FIG. 3.

DETAILED DESCRIPTION

An embodiment of the present application will be described below in detail with reference to FIGS. 1 through 7. In the following descriptions, references to the longitudinal direction, horizontal direction (vehicle-width direction) and vertical direction of a vehicle are relative to the position of an occupant seated in the driver's seat.

Figure 1:
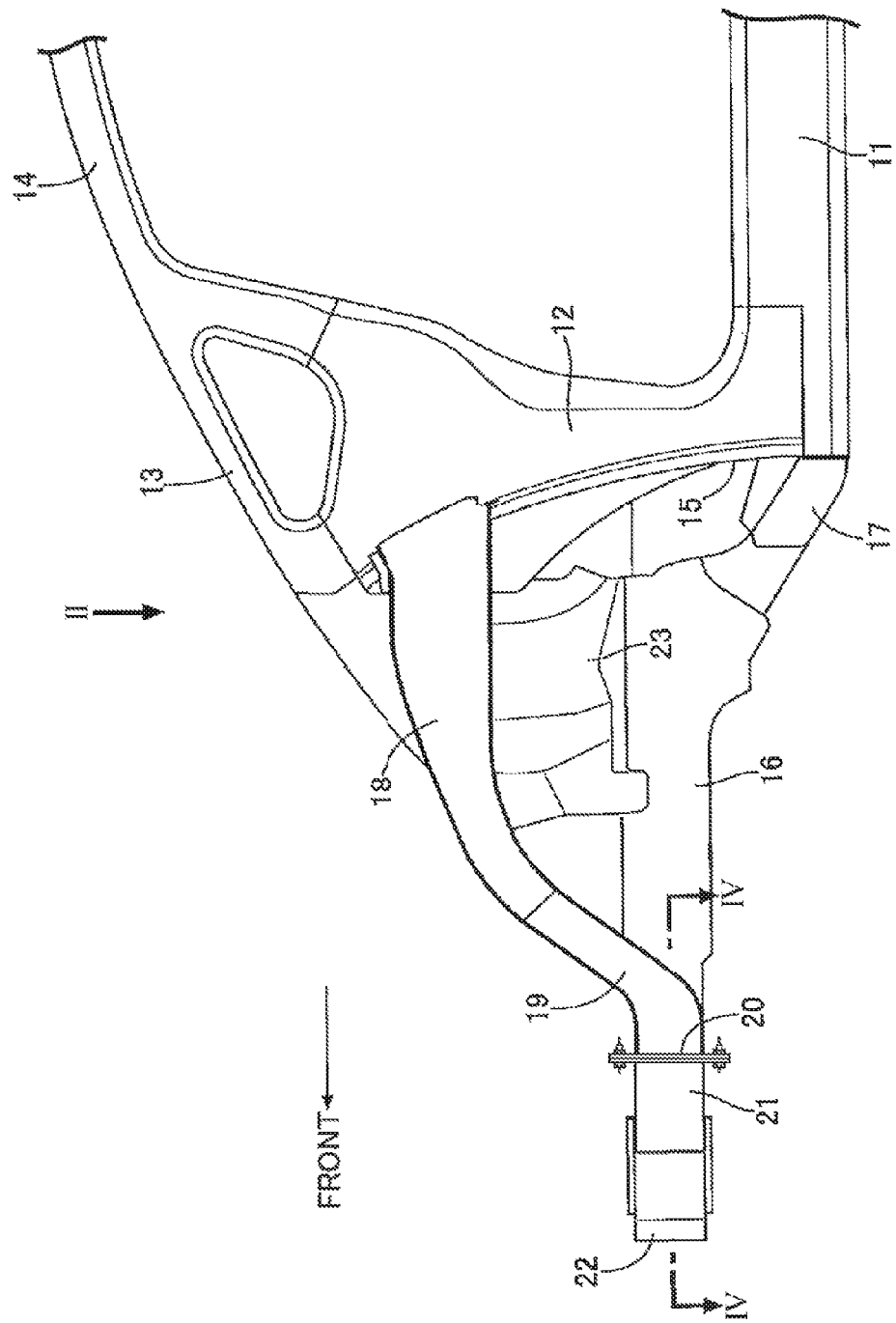
FIG. 1 is a side view of a left front section of a vehicle.
Figure 2:
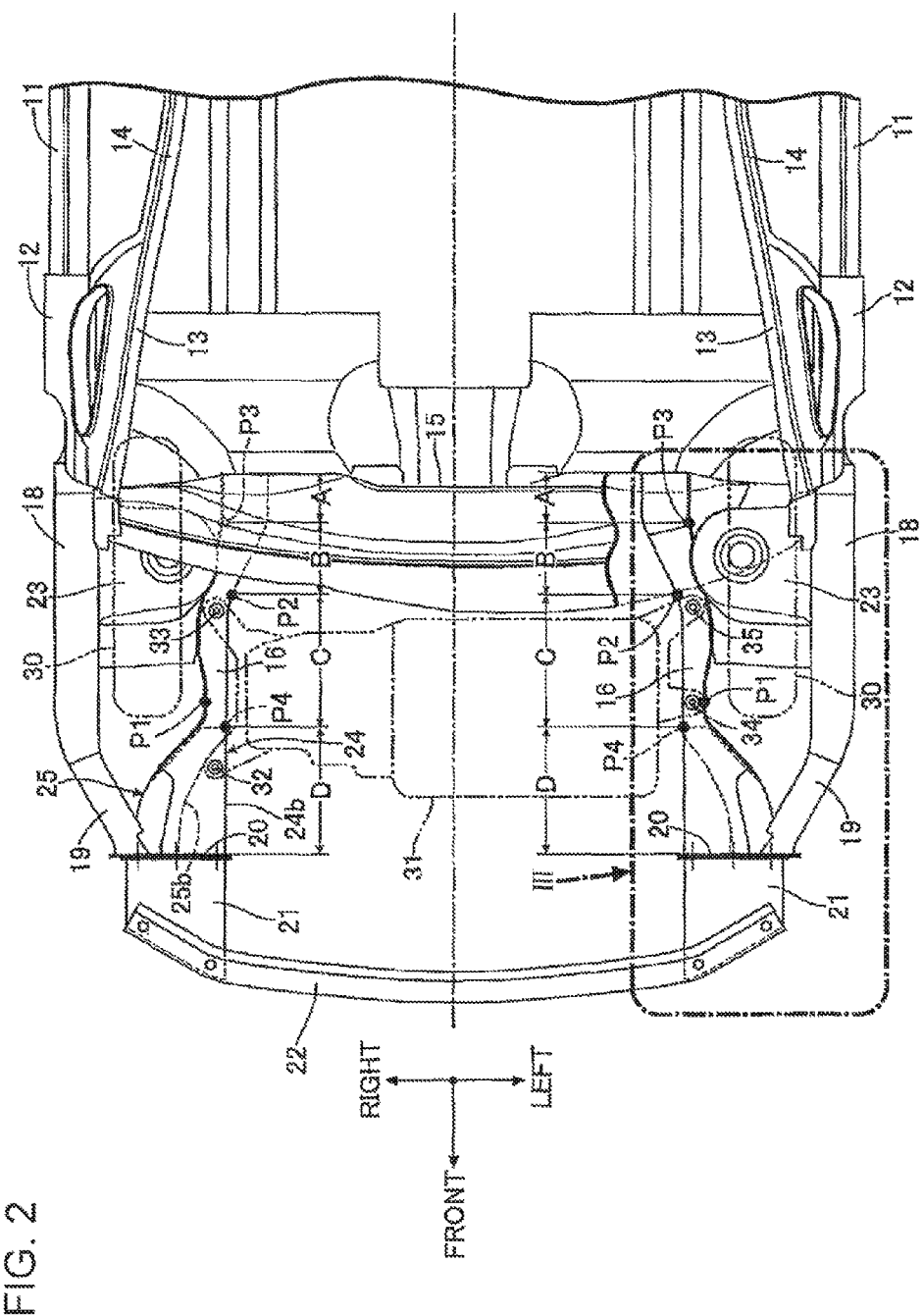
FIG. 2 is a view taken in the direction of an arrow indicated by II of FIG. 1.

As shown in FIGS. 1 and 2, a pair of right and left front pillar lowers 12, 12 extend upward from front ends of a pair of right and left side sills 11, 11 extending in the longitudinal direction along both side ends in the vehicle-width direction of a passenger compartment floor. Upper ends of a pair of front pillar uppers 13, 13 extending upward from upper ends of the right and left front pillar lowers 12, 12 are coupled to front ends of a pair of right and left roof side rails 14, 14. The right and left front pillar lowers 12, 12 are coupled to each other with a dash panel lower 15 extending upward from the floor therebetween. In addition, rear ends of a pair of right and left front side frames 16, 16 are coupled to a lower end of the dash panel lower 15. Furthermore, the rear ends of the right and left front side frames 16, 16 and lower ends of the right and left front pillar lowers 12, 12 are coupled to each other with a pair of right and left outriggers 17, 17 extending in the vehicle-width direction therebetween.

A pair of right and left upper members 18, 18 extend forward from the upper ends of the right and left front pillar lowers 12, 12, while a pair of right and left lower members 19, 19 extend from front ends of the right and left upper members 18, 18 downward to the front so as to be bent toward the inboard side in the vehicle-width direction. Front ends of the right and left front side frames 16, 16 and front ends of the right and left lower members 19, 19 are adjacent to each other in the vehicle-width direction and are coupled to each other with a pair of right and left mounting plates 20, 20 therebetween. In addition, a pair of right and left bumper beam extensions 21, 21 coupled to front surfaces of the right and left mounting plates 20, 20 are coupled to each other with a bumper beam 22 extending in the vehicle-width direction therebetween. Furthermore, inboard surfaces in the vehicle-width direction of the right and left upper members 18, 18 and outboard surfaces in the vehicle-width direction of the right and left front side frames 16, 16 are coupled to each other with a pair of damper bases 23, 23 therebetween.

Figure 3:
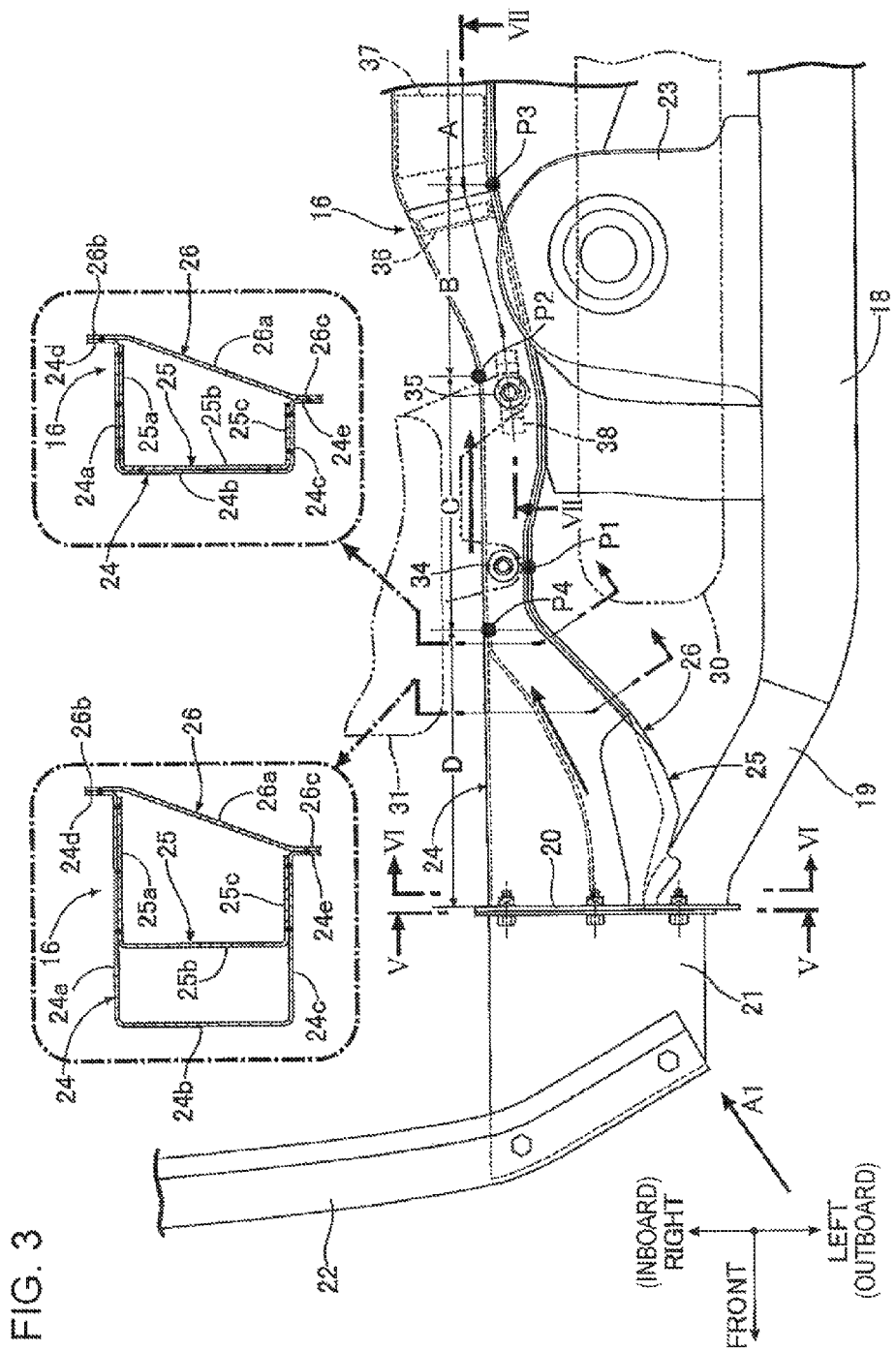
FIG. 3 is an enlarged view of a section indicated by III of FIG. 2.
Figure 6A:
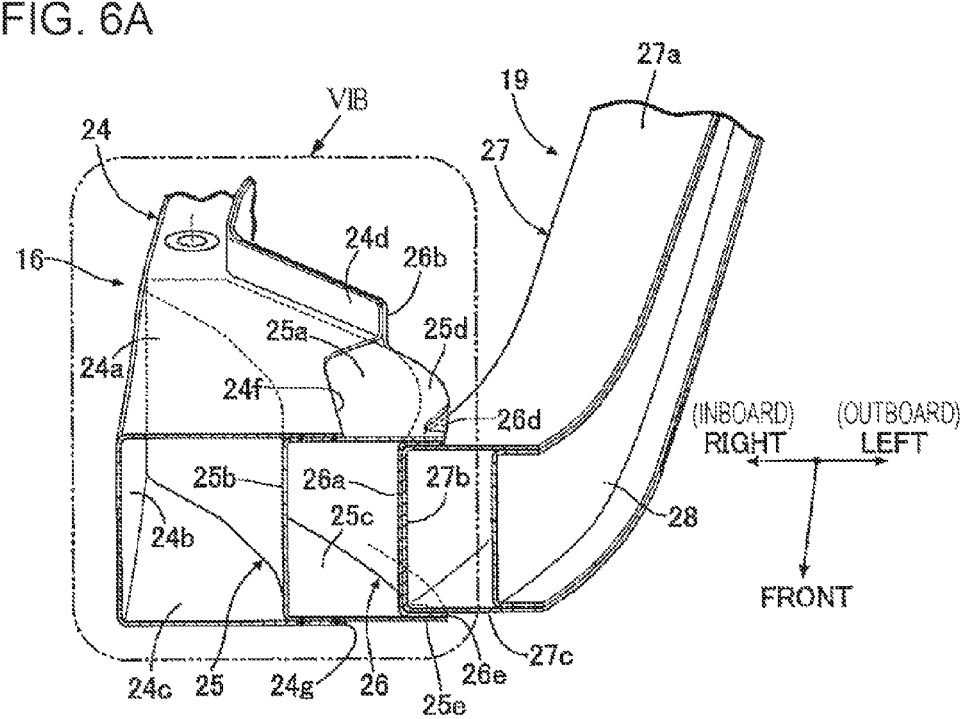
FIGS. 6A and 6B are cross-sectional views taken along the line VI-VI of FIG. 3.
Figure 6B:
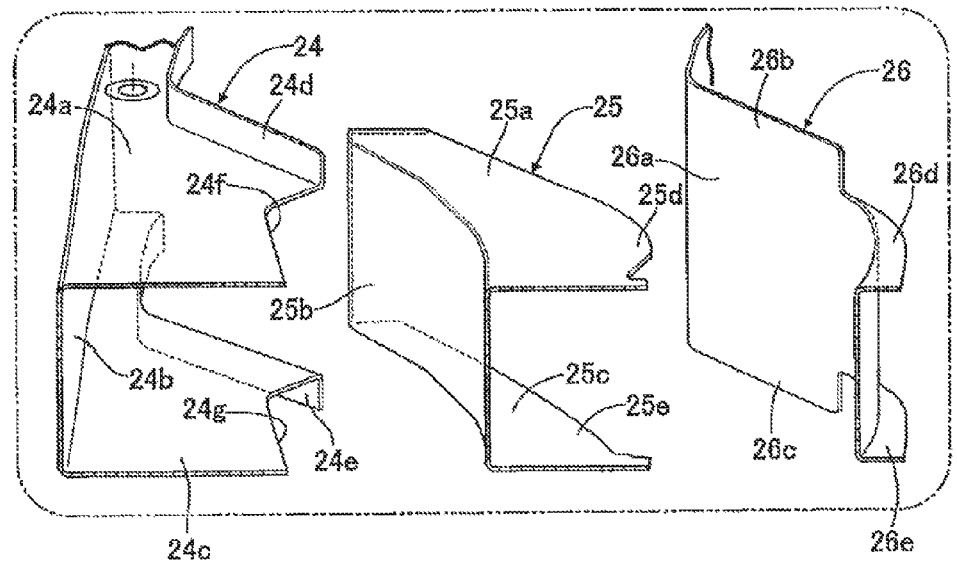

As shown in FIGS. 3, 6A, and 6B, the front side frame 16 is provided with a frame main body 24 having a U-shaped section that includes an upper wall 24a, a vehicle-width-direction inboard wall 24b, and a lower wall 24c and that opens to the outboard side in the vehicle-width direction, a reinforcing frame 25 having a U-shaped section that includes an upper wall 25a, a vehicle-width-direction inboard wall 25b, and a lower wall 25c and that opens to the outboard side in the vehicle-width direction, and a plate-like back plate 26 that closes openings of the frame main body 24 and the reinforcing frame 25.

At the rear end of the reinforcing frame 25, the upper wall 25a and the vehicle-width-direction inboard wall 25b of the reinforcing frame 25 overlap the upper wall 24a, the vehicle-width-direction inboard wall 24b, and the lower wall 24c of the frame main body 24. A portion of the vehicle-width-direction inboard wall 25b of the reinforcing frame 25 gradually separates farther away from the vehicle-width-direction inboard wall 24b of the frame main body 24 to the outboard side in the vehicle-width direction as the portion becomes closer to the front end of the reinforcing frame 25. In addition, in the front section of the reinforcing frame 25, the upper wall 25a and the lower wall 25c of the reinforcing frame 25 project to the outboard side in the vehicle-width direction through cutouts 24f, 24g formed at outboard ends in the vehicle-width direction of the upper wall 24a and the lower wall 24c of the frame main body 24.

At positions other than the foremost portion of the front side frame 16, the frame main body 24 is provided with a flange 24d formed by bending upward an outboard end in the vehicle-width direction of the upper wall 24a and a flange 24e formed by bending downward an outboard end in the vehicle-width direction of the lower wall 24c. Flanges 26b, 26c formed by extending upper and lower ends of a main body 26a of the back plate 26 upward and downward are welded to the flanges 24d, 24e. In addition, at the foremost portion of the front side frame 16, the back plate 26 is provided with flanges 26d, 26e formed by bending upper and lower ends thereof to the outboard side in the vehicle-width direction. Furthermore, the flanges 26d, 26e are laid on and welded to flanges 25d, 25e formed by extending outboard ends in the vehicle-width direction of the upper wall 25a and the lower wall 25c of the reinforcing frame 25 to the outboard side in the vehicle-width direction. With this arrangement, the front side frame 16 has a closed section over the entire length thereof.

The lower member 19 has a closed section, consisting of a frame main body 27 having a U-shaped section that includes an upper wall 27a, a vehicle-width-direction inboard wall 27b, and a lower wall 27c and that opens to the outboard side in the vehicle-width direction and a plate-like back plate 28 that closes an opening of the frame main body 27. In addition, at the foremost portion of the front side frame 16, the vehicle-width-direction inboard wall 27b, the upper wall 27a, and the lower wall 27c of the frame main body 27 of the lower member 19 are laid on and welded to the main body 26a and the inboard sides of the upper and lower flanges 26d, 26e of the back plate 26 of the front side frame 16, respectively. With this arrangement, a front end of the front side frame 16 and a front end of the lower member 19 are coupled to each other in the vehicle-width direction.

Figure 4:
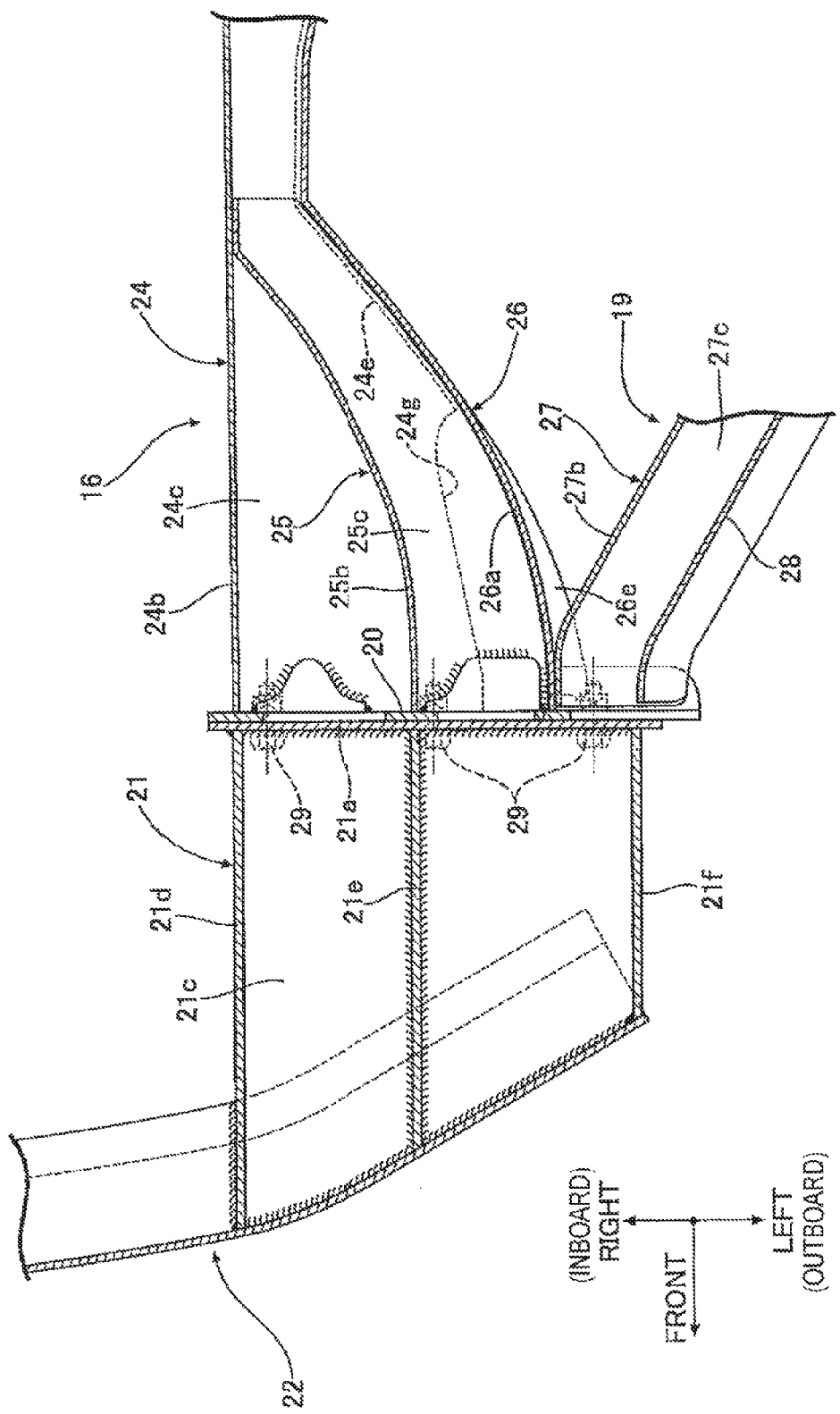
FIG. 4 is a cross-sectional view taken along the line IV-IV of FIG. 1.
Figure 5:
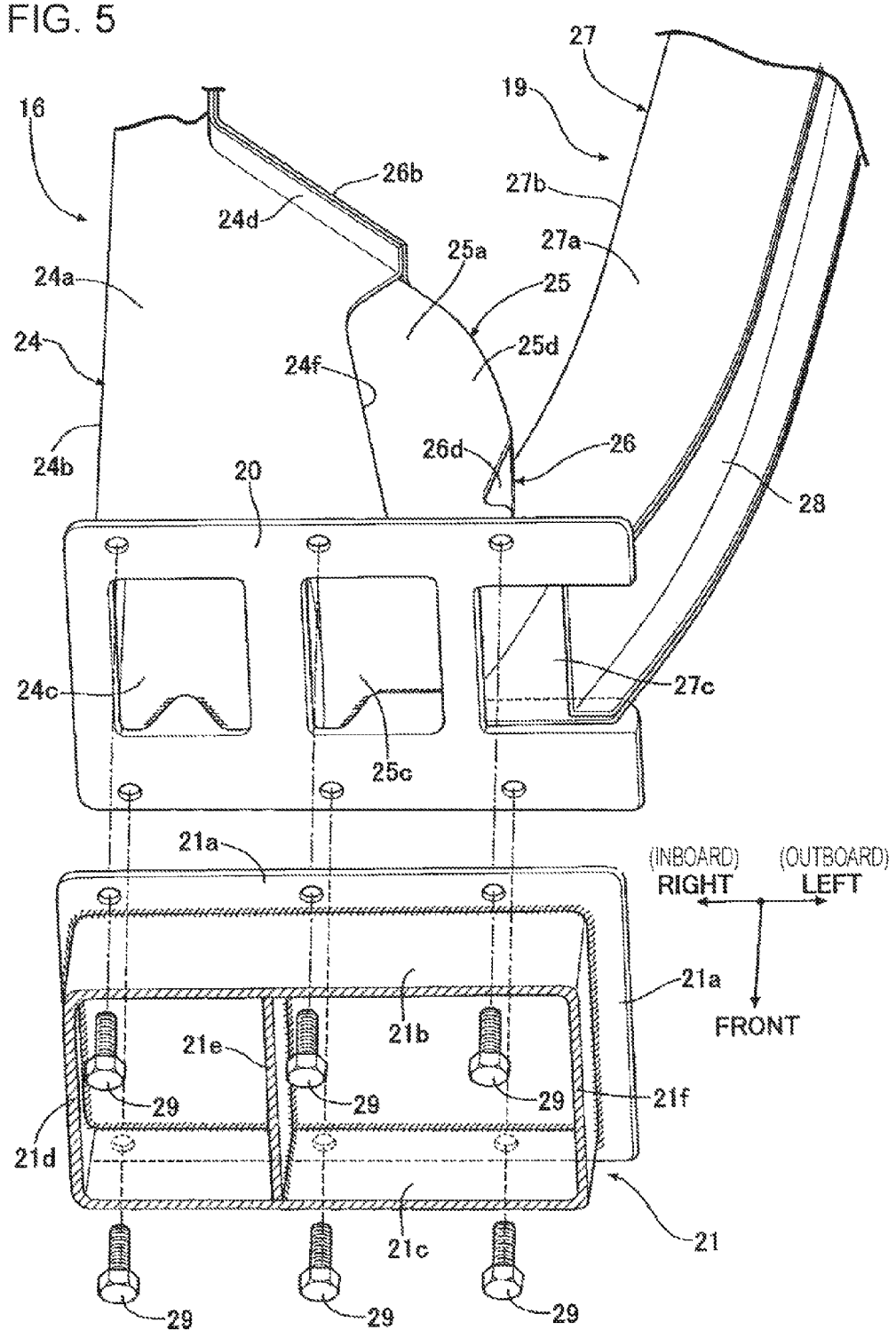
FIG. 5 is a cross-sectional view taken along the line V-V of FIG. 3.

As shown in FIGS. 4 and 5, the plate-like mounting plate 20 is welded to the front ends of the front side frame 16 and the lower member 19 that are coupled to each other. A mounting flange 21a welded to a rear end of a bumper beam extension 21 is coupled to the front surface of the mounting plate 20 with a plurality of bolts 29. The bumper beam extension 21 is provided with an upper wall 21b, a lower wall 21c, a vehicle-width-direction inboard wall 21d, a partition wall 21e, and a vehicle-width-direction outboard wall 21f and has a horizontally long, substantially B-shaped section with the dimension in the vehicle-width direction larger than the vertical dimension. The vehicle-width-direction inboard wall 21d of the bumper beam extension 21 is longitudinally aligned with the vehicle-width-direction inboard wall 24b of the frame main body 24 of the front side frame 16, while the partition wall 21e of the bumper beam extension 21 is longitudinally aligned with the vehicle-width-direction inboard wall 25b of the reinforcing frame 25 of the front side frame 16. In addition, the vehicle-width-direction outboard wall 21f of the bumper beam extension 21 is longitudinally aligned with a back plate 28 that constitutes a vehicle-width-direction outboard wall of the lower member 19.

As shown in FIGS. 2 and 3, the front side frame 16 has a branch point P4, a first break point P1, a second break point P2, and a third break point P3 that are arranged in order from front to rear. In the front side frame 16, a section extending rearward from the third break point P3 is defined as a frame floor section A. A section between the third break point P3 and the second break point P2 is defined as a frame slanted section B. In addition, a section between the second break point P2 and the branch point P4 beyond the first break point P1 is defined as a frame linear section C. Furthermore, a section extending forward from the branch point P4 is defined as a frame widened section D.

The frame floor section A extends longitudinally with a substantially constant width in the vehicle-width direction. The frame slanted section B extending forward from the frame floor section A is curved toward the outboard side in the vehicle-width direction with the width decreasing in the vehicle-width. The frame linear section C extending forward from the frame slanted section B has the vehicle-width-direction inboard wall thereof aligned longitudinally and has the front of the vehicle-width-direction outboard wall thereof recessed toward the inboard side in the vehicle-width direction and has the minimum width in the vehicle-width direction at the first break point P1. In other words, the frame linear section C has the minimum cross-sectional area at the first break point P1 and has increased cross-sectional areas in portions preceding and succeeding the first break point P1. The frame widened section D extending forward from the frame linear section C corresponds to a region where the reinforcing frame 25 extends, and the section D has the vehicle-width-direction inboard wall aligned longitudinally and has its vehicle-width-direction outboard wall bulging more toward the outboard side at a position thereof closer to the front.

Accordingly, the front side fraise 16 has the vehicle-width-direction inboard wall that is longitudinally aligned within a range of the frame floor section A, that is slanted at the front thereof toward the outboard side in the vehicle-width direction within a range of the frame slanted section B, and that is longitudinally aligned within a range of the frame linear section C and the frame widened section D. In addition, the front side frame 16 has the vehicle-width-direction outboard wall that is longitudinally aligned within a range of the frame floor section A, that is slanted at the front thereof toward the outboard side in the vehicle-width direction within a range of the frame slanted section B, and that is recessed toward the inboard side in the vehicle-width direction in the vicinity of the first break point P1 of the frame linear section C and that is then slanted at the front thereof toward the outboard side in the vehicle-width direction within a range of the frame widened section D. A recess of the frame linear section C formed in the vicinity of the first break point P1 prevents a steered front wheel 30 (see FIG. 3) from coming into contact with the front side frame 16.

A power unit 31 having an engine and a transmission as a unit is supported on the right and left front side frames 16, 16 by two right mounts 32, 33 and two left mounts 34, 35, respectively.

As shown in FIGS. 3 and 7, the front side frame 16 has a bulkhead 36 for partitioning the inside thereof provided just in front of the third break point P3 and has a stiffener 37 provided just in the rear of the third break point P3, the stiffener 37 being laid on the lower wall 24c. The left rear mount 35 of the four mounts 32 through 35 of the power unit 31 is fastened with a bolt 40 to a nut collar 39 of a mounting bracket 38 formed inside of the front side frame 16. The mounting bracket 38 formed in the shape of a hat is welded at fixing members 38a, 38a of both ends thereof to the lower wall 24c of the frame main body 24. In addition, the nut collar 39 is welded to a nut collar supporting member 38b provided midway between the fixing members 38a, 38a. The second break point P2 of the front side frame 16 is configured to be located between one of the fixing members 38a and the nut collar supporting member 38b.

As shown in FIG. 2, the right front mount 32 of the four mounts 32 through 35 of the power unit 31 is disposed between the vehicle-width-direction inboard wall 24b of the frame main body 24 of the front side frame 16 and the vehicle-width-direction inboard wall 25b of the reinforcing frame 25, namely, inside of the closed section formed by the frame main body 24 and the reinforcing frame 25.

Next, the vehicle body structure according to this embodiment will be described in terms of operation.

The front side frame 16 is configured to have a closed section through the coupling between the frame main body 24 having a U-shaped section that opens to the outboard side in the vehicle-width direction and the back plate 26 that closes the opening of the frame main body 24. The reinforcing frame 25 having a U-shaped section that opens to the outboard side in the vehicle-width direction in the frame widened section D of the front side frame 16 is fitted to the inside of the frame main body 24. In addition, the vehicle-width-direction inboard wall 25b of the reinforcing frame 25 is coupled to the vehicle-width-direction inboard wall 24b of the frame main body 24 at the branch point P4. Furthermore, a portion of the vehicle-width-direction inboard wall 25b in front of the branch point P4 separates from the vehicle-width-direction inboard wall 24b of the frame main body 24 to the outboard side in the vehicle-width direction. The opening of the reinforcing frame 25 is closed by the back plate 26 in the front section of the frame widened section D. The inboard wall 25b would branch away from the inboard wall 24b.

With this arrangement, an impact load (see an arrow A1 of FIG. 3) applied to a front end of the reinforcing frame 25 in the event of an oblique collision is transmitted to the vehicle-width-direction inboard wall 25b of the reinforcing frame 25 and then to the branch point P4 where the transmission of the impact load is switched to the frame linear section C, which avoids concentration of the impact load on the first break point P1 having a vehicle-width-direction outboard end of the frame linear section C recessed toward the inboard side in the vicinity thereof, thereby enabling the impact load to be preferentially transmitted to the second break point P2. This ensures that the second break point P2 provided in the middle of the first and third break points P1, P3 arranged in order from front to rear is first bent and subsequently the first and third break points P1, P3 are bent. Consequently, the bending of the first to third break points P1, P2, P3 improves the absorption of impact energy associated with an oblique collision.

At this time, the frame main body 24 having a U-shaped section that opens to the outboard side in the vehicle-width direction and the reinforcing frame 25 having a U-shaped section that opens to the outboard side in the vehicle-width direction are fitted to each other in the frame widened section D extending from the branch point P4 to the front end in the front side frame 16, which strengthens an inboard end in the vehicle-width direction of the front side frame 16, thereby enabling a smoother load transmission.

In addition, due to the recess formed on the outboard side in the vehicle-width direction of the first break point P1, the cross-sectional area of the frame linear section C at the first break point P1 is smaller than the cross-sectional areas of the frame linear section C at portions preceding and succeeding the first break point P1 (see FIG. 3). The recess can prevent the steered front wheel 30 from coming into contact with the front side frame 16 even if the frame widened section D of the front side frame 16 is widened toward the outboard side in the vehicle-width direction to allow the installation of the transverse-mounted power unit 31 having a larger vehicle-width-direction dimension. Moreover, the impact load can be transmitted from the first break point P1 to the second break point P2 without any difficulty while the inboard end in the vehicle-width direction of the frame linear section C is kept linear.

In addition, due to the bulkhead 36 and the stiffener 37 provided as reinforcing members at portions preceding and succeeding the third break point P3 in the front side frame 16 (see FIG. 7), the third break point P3 can be configured to have lower rigidity than portions of the bulkhead 36 in front thereof and the stiffener 37 in the rear thereof, thereby ensuring that the third break point P3 is bent due to an impact load. Moreover, the mounting bracket 38 for the left rear mount 35 on which the power unit 31 is supported is coupled to the front side frame 16 with its both ends' two fixing members 38a, 38a therebetween and the second break point P2 is provided between the two fixing members 38a, 38a (see FIG. 7). With this arrangement, the second break point P2 can be configured to have a relatively lower strength, thereby ensuring that the second break point P2 is bent.

In addition, the bumper beam extension 21 is supported on the mounting plate 20 coupled to the front ends of the frame main body 24, the reinforcing frame 25, and the lower member 19 that are aligned in the vehicle-width direction. With this arrangement, when subjected to an impact load in the event of a frontal collision, the frame main body 24, the reinforcing frame 25, and the lower member 19 generate a reactive force, which causes the bumper beam extension 21 to be effectively crushed and thereby improves energy absorption effects.

In addition, the bumper beam extension 21 is a cylindrical body having a horizontally long section with its dimension in the vehicle-width direction larger than its dimension in the vertical direction and has the longitudinally extending partition wall 21e between the vehicle-width-direction inboard wall 21d and the vehicle-width-direction outboard wall 21f. The vehicle-width-direction inboard wall 21d of the bumper beam extension 21 is aligned with the vehicle-width-direction inboard wall 24d of the frame main body 24 in this order from front to rear. The partition wall 21e of the bumper beam extension 21 is also aligned with the vehicle-width-direction inboard wall 25b of the reinforcing frame 25 in this order from front to rear. Moreover, the vehicle-width-direction outboard wall 21f of the bumper beam extension 21 is also aligned with the back plate 28 constituting the vehicle-width-direction outboard wall of the lower member 19 in this order from front to rear. With this arrangement, an impact load applied to the bumper beam extension 21 is effectively transmitted to the front side frame 16 and the lower member 19, which encourages the bumper beam extension 21 to foe crushed and thereby improves energy absorption effects. Moreover, the bumper beam extension 21 having a cross section with the longer dimension in the vehicle-width direction is resistant to falling when subjected to an impact load, further ensuring the crushing of the bumper beam extension 21.

In addition, in the rear section of the reinforcing frame 25, the flanges 24d, 24e formed by bending the upper wall 24a of the frame main body 24 upward and the lower wall 24c of the frame main body 24 downward, respectively, are coupled to the flanges 26b, 26c formed by extending the upper end of the back plate 26 upward and the lower end of the back plate 26 downward, respectively, while, in the front section of the reinforcing frame 25, the flanges 26d, 26e formed by bending the upper and lower ends of the back plate to the outboard side in the vehicle-width direction, respectively, are coupled to the flanges 25d, 25e of the reinforcing frame 25 and the upper and lower walls 27a, 27c of the frame main body 27 of the lower member 19, respectively, the flanges 25d, 25e being formed by extending the upper and lower walls 25a, 25c of the reinforcing frame 25 to the outboard side in the vehicle-width direction. This arrangement ensures that the frame main body 24 and the back plate 26 are tightly integrated with each other in the rear section of the frame widened section D and that the reinforcing frame 25, the back plate 26, and the lower member 19 are also tightly integrated with one another in the front section of the frame widened section D.

Furthermore, in the front section of the frame widened section D, the outboard ends in the vehicle-width direction of the upper wall 25a and the lower wall 25c of the reinforcing frame 25 project to the outboard side in the vehicle-width direction through cutouts 24f, 24g formed in the upper wall 24a and the lower wall 24c of the frame main body 24. This enables the front section of the front side frame 16 to be widened while an increase in weight is minimized. In addition, in the front section of the frame widened section D, a portion of the vehicle-width-direction inboard wall 25b of the reinforcing frame 25 gradually separates farther away from the vehicle-width-direction inboard wall 24b of the frame main body 24 to the outboard side in the vehicle-width direction as the portion becomes closer to the front end of the reinforcing frame 25. Moreover, the right front mount 32 (see FIG. 2) for supporting the power unit 31 is provided between the vehicle-width-direction inboard wall 25b of the reinforcing frame 25 and the vehicle-width-direction inboard wall 24b of the frame main body 24. This enables the mount 32 to be provided in a high-strength area where a closed section is formed by the frame main body 24 and the reinforcing frame 25, thereby improving the support rigidity.

The present application is typically described with reference to, but not limited to, the foregoing embodiment. Various modifications are conceivable within the scope of the present application. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body structure comprising:
   right and left front side frames each disposed I n a front section of a vehicle and extending substantially longitudinally, the respective front side frames including:
   a frame floor section that longitudinally extends along an underside of a floor,
   a frame slanted section that extends obliquely forward from a third break point located at a front end of the frame floor section so as to be bent outward in a vehicle-width direction,
   a frame linear section that extends forward from a second break point located at a front end of the frame slanted section, the fraise linear section including an outer-side edge in the vehicle-width direction being recessed inboard in the vehicle-width direction at a first break point located at an intermediate position of the frame linear section in the longitudinal direction, and
   a frame widened section that extends forward from a branch point located at a front end of the frame linear section so as to have an outer side edge in the vehicle-width direction bulging more outboard in the vehicle-width direction toward the front of the vehicle,
   wherein each of the front side frames has a closed section comprising a frame main body having a U-shaped section that opens outboard in the vehicle-width direction and a back plate that closes an opening of the frame main body, the frame main body including an inboard wall in the vehicle width direction;
   wherein the frame widened section includes a reinforcing frame having a U-shaped section that opens outboard in the vehicle-width direction and that is fitted to an inside of the frame main body, the reinforcing frame including an inboard wall in the vehicle width direction; and
   wherein the inboard wall of the reinforcing frame is joined to the inboard wall of the frame main body at the branch point and a portion of the inboard wall of the reinforcing frame in front of the branch point is separated away from the inboard wall of the frame main body outboard in the vehicle-width direction, and the opening of the reinforcing frame is closed by the back plate at a front section of the frame widened section.

2. The vehicle body structure according to claim 1, further comprising a front pillar, an upper member extending forward from the front pillar, and a lower member that extends forward from a front end of the upper member to be laid on the outboard side in the vehicle-width direction of the front side frame, and
   wherein front ends of the frame main body, the reinforcing frame, and the lower member are aligned in the vehicle-width direction, and a bumper beam extension is supported by a mounting plate connected to the front ends of the frame main body, the reinforcing frame, and the lower member.

3. The vehicle body structure according to claim 2,
   wherein, at a rear section of the reinforcing frame, flanges of the frame main body formed by bending an upper wall of the frame main body upward and a lower wall of the frame main body downward, respectively, are joined to first flanges of the back plate formed by extending an upper end of the back plate upward and a lower end of the back plate downward, respectively; and
   wherein, at a front section of the reinforcing frame, second flanges of the back plate formed by bending upper and lower ends of the back plate outboard in the vehicle-width direction, respectively, are joined to flanges of the reinforcing frame and upper and lower walls of the lower member, respectively, the flanges of the reinforcing frame being formed by extending upper and lower walls of the reinforcing frame outboard in the vehicle-width direction, respectively.

4. The vehicle body structure according to claim 2,
   wherein the bumper beam extension is a cylindrical body having a cross-section having a horizontal dimension larger than a vertical dimension, the bumper beam extension includes an inboard side wall in the vehicle-width direction thereof, an outboard side wall in the vehicle-width direction thereof, and a longitudinally extending partition wall between the inboard side wall and the outboard side wall,
   wherein the inboard side wall of the bumper beam extension is aligned with a front end of the inboard wall of the frame main body longitudinally,
   wherein the partition wall of the bumper beam extension is aligned with a front end of the inboard wall of the reinforcing frame longitudinally, and
   wherein the outboard side wall of the bumper beam extension is aligned with a front end of an outboard wall in the vehicle-width direction of the lower member longitudinally.

5. The vehicle body structure according to claim 1,
   wherein, at the front section of the frame widened section, outboard ends in the vehicle-width direction of an upper wall and a lower wall of the reinforcing frame project from the frame main body outward in the vehicle-width direction.

6. The vehicle body structure according to claim 1,
   wherein, at the front section of the frame widened section, the inboard wall of the reinforcing frame is separated away from the inboard wall of the frame main body outward in the vehicle-width direction, and
   wherein a mount for supporting a power unit is provided to the frame widened section at a position between the inboard wall of the reinforcing frame and the inboard wall of the frame main body at the front section of the frame widened section.

7. The vehicle body structure according to claim 1,
   wherein a mounting bracket to attach a mount for supporting a power unit is joined to the respective front side frame, the mounting bracket including two fixing portions disposed at both ends thereof respectively, the two fixing portions being fixed to the front side frame, and
   wherein the second break point is provided between the two fixing portions.

8. The vehicle body structure according to claim 1,
   wherein the recessed outer side edge at the first break point is provided so as to avoid contact with a front end of a steered front wheel; and
   wherein a cross-sectional area of the frame linear section at the first break point is smaller than cross-sectional areas of the frame linear section at portions in front of and at a rear of the first break point.

9. The vehicle body structure according to claim 1,
wherein the respective front side frame is provided with reinforcing members at portions in front of and at a rear of the third break point.

10. The vehicle body structure according to claim 2,
wherein the inboard wall of the reinforcing frame is disposed between the inboard wall of the frame main body and the back plate, and the inboard wall of the reinforcing frame includes a base portion extending parallel to the inboard wall of the frame main body and joined to the inboard wall of the frame main body, and a bent portion in front of the base portion, the bent portion being bent away from the inboard wall of the frame main body in the vehicle-width direction.

11. A vehicle comprising the vehicle body structure according to claim 1.

* * * * *